United States Patent
Erickson (10) Patent No.: US 8,627,156 B1
(45) Date of Patent: Jan. 7, 2014

(54) METHOD AND SYSTEM OF TESTING BIT ERROR RATE USING SIGNAL WITH MIXTURE OF SCRAMBLED AND UNSCRAMBLED BITS

(75) Inventor: Bruce Erickson, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 546 days.

(21) Appl. No.: 12/912,042

(22) Filed: Oct. 26, 2010

(51) Int. Cl.
*G06F 11/00* (2006.01)

(52) U.S. Cl.
USPC .......................................................... 714/707

(58) Field of Classification Search
USPC ........................................................... 714/707
See application file for complete search history.

(56) References Cited

U.S. PATENT DOCUMENTS

| | | | | |
|---|---|---|---|---|
| 5,022,051 A * | 6/1991 | Crandall et al. | ............... | 375/292 |
| 5,438,621 A * | 8/1995 | Hornak et al. | ................... | 380/43 |
| 5,459,731 A * | 10/1995 | Brief et al. | ..................... | 714/704 |
| 5,497,377 A * | 3/1996 | Muto et al. | ..................... | 714/715 |
| 5,623,497 A * | 4/1997 | Shimawaki et al. | .......... | 714/704 |
| 6,069,876 A * | 5/2000 | Lander et al. | ................. | 370/249 |
| 6,268,808 B1 * | 7/2001 | Iryami et al. | ..................... | 341/51 |
| 6,628,621 B1 * | 9/2003 | Plankenhorn et al. | ........ | 370/249 |
| 6,662,332 B1 * | 12/2003 | Kimmitt | ........................ | 714/762 |
| 7,386,767 B1 * | 6/2008 | Xue et al. | ........................ | 714/704 |
| 7,564,798 B2 * | 7/2009 | Haber | ............................ | 370/252 |
| 7,571,360 B1 * | 8/2009 | Lewicki et al. | ................ | 714/704 |
| 7,617,424 B2 * | 11/2009 | Frodsham et al. | ............ | 714/704 |
| 7,761,764 B2 * | 7/2010 | Hurley | ............................ | 714/740 |
| 7,969,163 B2 * | 6/2011 | Fishman et al. | ............... | 324/617 |
| 7,979,756 B2 * | 7/2011 | Dickens et al. | ................ | 714/715 |
| 8,065,584 B2 * | 11/2011 | Coles et al. | .................... | 714/752 |
| 8,195,996 B2 * | 6/2012 | Frodsham et al. | ............ | 714/736 |
| 8,228,216 B2 * | 7/2012 | Motta et al. | ...................... | 341/87 |
| 8,228,974 B2 * | 7/2012 | Poirrier et al. | ................. | 375/229 |
| 2001/0033568 A1 * | 10/2001 | Spooner | ......................... | 370/366 |
| 2002/0129307 A1 * | 9/2002 | Walker et al. | ................. | 714/715 |
| 2002/0149812 A1 * | 10/2002 | Hong et al. | .................... | 359/110 |
| 2002/0150334 A1 * | 10/2002 | Richardson et al. | ............ | 385/37 |
| 2002/0176139 A1 * | 11/2002 | Slaughter et al. | ............. | 359/172 |
| 2003/0005385 A1 * | 1/2003 | Stieger | ........................... | 714/758 |
| 2003/0026332 A1 * | 2/2003 | Taunton | ......................... | 375/222 |
| 2003/0065990 A1 * | 4/2003 | Barford | ......................... | 714/704 |
| 2003/0097622 A1 * | 5/2003 | Liu et al. | ....................... | 714/704 |
| 2004/0107391 A1 * | 6/2004 | Bauman | ......................... | 714/704 |
| 2006/0200708 A1 * | 9/2006 | Gentieu et al. | ................ | 714/704 |

OTHER PUBLICATIONS

D. Das Sharma, "PCIe 3.0 PHY Logical Layer Requirements", PCIe Technology Serminar, www.pcisig.com, pp. 1-28.

* cited by examiner

*Primary Examiner* — Amine Riad (57) ABSTRACT

A device under test (DUT) is tested by: receiving a signal transmitted by the DUT, wherein the signal includes first portions that include scrambled bits produced from a selected bit pattern and a selected scrambling algorithm, and further includes second portions that include unscrambled bits, the first portions and second portions being interspersed within the signal; detecting received scrambled bits within the received signal; generating a test bit sequence using the selected scrambling algorithm and the selected bit pattern, including generating a bit of the test bit sequence for each of the received scrambled bits within the received signal, and not generating a bit of the test bit sequence for each of the received unscrambled bits within the received signal; and comparing the received scrambled bits to the test bit sequence to determine a bit error rate of the received signal.

16 Claims, 9 Drawing Sheets

METHOD AND SYSTEM OF TESTING BIT ERROR RATE USING SIGNAL WITH MIXTURE OF SCRAMBLED AND UNSCRAMBLED BITS

BACKGROUND

Analyzers have been developed to test the performance of a device under test (DUT), including testing transmitters, receivers, and/or communications channels employed by such a DUT. In some cases, these analyzers need to be able to determine a bit error rate (BER) of a signal received by the analyzer from the device under test (DUT).

In such cases, it is necessary to place the DUT in an operating mode where it can generate an appropriate bit pattern that can be used for performing a bit error rate (BER) measurement. In the past this has often been done by placing the DUT into a test mode where an internal pseudorandom bit stream (PRBS) test signal generator of the DUT is employed to generate a signal for measuring the BER.

However, some DUTs do not include a capability to be placed into a test mode where they transmit a PRBS signal for BER measurements.

It would be desirable to provide an efficient approach for testing the BER of a device under test without forcing the device to enter a test mode and generate a pseudorandom bit stream test signal.

SUMMARY

In an example embodiment, a method is provided for testing a device under test (DUT). The method comprises: receiving a signal transmitted by the DUT, wherein the signal includes first portions that include scrambled bits produced from a selected bit pattern and a selected scrambling algorithm, and further includes second portions that include unscrambled bits, the first portions and second portions being interspersed within the signal; detecting received scrambled bits within the received signal; generating a test bit sequence using the selected scrambling algorithm and the selected bit pattern, including generating a bit for the test bit sequence for each of the received scrambled bits within the received signal, and not generating a bit for the test bit sequence for each of the received unscrambled bits within the received signal; and comparing the received scrambled bits to the test bit sequence to determine a bit error rate of the received signal.

In another example embodiment, an apparatus includes a device for receiving a signal transmitted by a DUT, and a processor configured to cause the apparatus to execute an algorithm. The signal includes first portions that include scrambled bits produced from a selected bit pattern and a selected scrambling algorithm, and further includes second portions that include unscrambled bits, the first portions and second portions being interspersed within the signal. The algorithm comprises: detecting received scrambled bits within the received signal: generating a test bit sequence using the selected scrambling algorithm and the selected bit pattern, including generating a bit for the test bit sequence for each of the received scrambled bits within the received signal, and not generating a bit for the test bit sequence for each of the received unscrambled bits within the received signal; and comparing the received scrambled bits to the test bit sequence to determine a bit error rate of the received signal.

In yet another embodiment, a method is provided analyzing a signal. The method comprises receiving a signal transmitted by a Peripheral Component Interconnect Express (PCIe) device in a logical idle mode of the PCIe device, wherein the signal includes: (1) first blocks each comprising: (A) header bits that are not scrambled, and (B) scrambled bits including sequences of scrambled zeros, scrambled but non-zero Update Flow Control packets and scrambled but non-zero End Data Stream packets; (2) second blocks comprising unscrambled Skip Ordered Set data; and (3) third blocks comprising Electrical Idle Exit Ordered Set data, wherein the scrambled zeros, scrambled Update Flow Control packets and scrambled End Data Stream packets are generated with a selected scrambling algorithm, and wherein the first blocks, second blocks and third blocks are interspersed within the signal. The method further comprises: providing a test linear feedback shift register (LFSR) operating with the selected scrambling algorithm to generate a test bit sequence; determining block boundaries for the first blocks; synchronizing the test LFSR to the scrambled zeros and the block boundaries for the first blocks in the received signal so as to advance the test LFSR for the scrambled zeros and to not advance the test LFSR for the header bits; detecting received bits of the second blocks within the received signal, and not advancing the test LFSR for the received bits of the second blocks; detecting received bits of the third blocks within the received signal, and in response thereto resynchronizing the test LFSR to the scrambled zeros and the block boundaries for the first blocks in the received signal; detecting received scrambled bits within the received signal; and comparing the received scrambled bits to the test bit sequence to determine a bit error rate of the received signal.

BRIEF DESCRIPTION OF THE DRAWINGS

The example embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
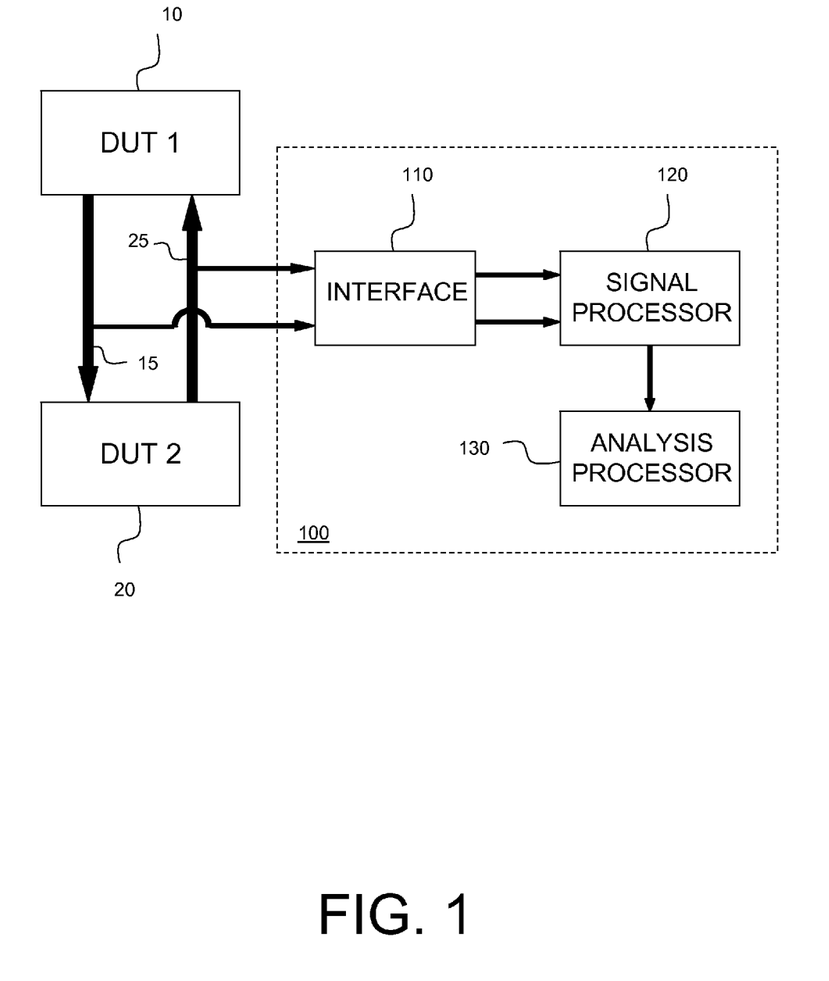
FIG. 1 illustrates one embodiment of an arrangement for analyzing a device under test (DUT).

FIG. 1 illustrates one embodiment of an arrangement for analyzing a device under test (DUT). FIG. 1 shows first and second DUTs 10 and 20 having a first communication channel 15 for communicating data from DUT 10 to DUT 20 and a second communication channel 25 for communicating data from DUT 20 to DUT 10. First and second communication channels may comprise a plurality of signal lines or differential signal line pairs each communicating a signal from one DUT to the other.

FIG. 1 also shows an analyzer 100 for analyzing DUT 10 and/or DUT 20, and particularly for analyzing first and/or second communication channels 15 and 25, and more particularly one or more signacommunicated via first and/or second communication channels 15 and 25. Analyzer 100 includes an active or passive interface 110, a signal processor 120 and an analysis processor 130.

Passive interface 110 probes one or more signals communicated on first and/or second communication channels 15 and 25 and communicates a probed signal(s) to signal processor 120 which performs signal processing on the probed signal using one or more processing parameters. The processed signal is then provided to analysis processor 130, which may be a field programmable gate array (FPGA) for analysis.

In some cases, analyzer 100 may need to adjust one or more of its parameters (e.g., clock phase or frequency; voltage thresholds; etc.) to eliminate sub-optimal probing. One convenient mechanism for determining when the parameter(s) are optimized is to measure the bit error rate (BER) of a signal received by analyzer 100 from a device under test (DUT) (e.g., DUT 10 and/or DUT 20), and then adjusting the parameter(s) until the BER is minimized.

In such cases, it is necessary to place the DUT in an operating mode where it can generate an appropriate bit pattern that can be used for performing a bit error rate (BER) measurement. In the past this has often been done by placing the DUT into a test mode where an internal pseudorandom bit stream (PRBS) test signal generator of the DUT is employed to generate a signal for measuring the BER.

However, some DUTs do not include a capability to be placed into a test mode where they transmit a PRBS signal for BER measurements.

However, it is still desired to be able to measure the BER of a signal from such a DUT to adjust analyzer 100 for optimizing its probing.

In some cases, a DUT may scramble portions of its data transmissions, for example using a transmit linear feedback shift register (LFSR), and may have a normal operating mode (i.e., not a special mode employed just for testing the DUT) where the DUT transmits a signal that includes such scrambled bits interspersed with other unscrambled bits. In those cases, systems and methods described below may be employed to determine a BER of a signal transmitted by the DUT.

To provide a concrete example so that various principles may be explained and understood in detail, an illustrative embodiment will be described below with respect to a DUT comprising a Peripheral Component Interconnect Express (PCI Express or PCIe) device. However, it should be understood that these principles are not necessarily limited to the context of a PCIe device, but as appropriate may be applied to other devices which have normal operating modes where they transmit a signal that includes scrambled bits interspersed with unscrambled bits.

PCIe is a computer expansion card standard used in consumer, server, and industrial applications, as a motherboard-level interconnect (to link motherboard-mounted peripherals) and as an expansion card interface for add-in boards.

Third generation (Gen3) PCIe devices have as a normal operating mode a Logical Idle mode wherein they transmit a series of 130-bit blocks each having one of various block formats. Also, in PCIe Gen3 assumes that communication channels are bonded; that is if there are multiple "lanes" (e.g., a lane may be a differential signal pair path from one PCIe device to another PCIe device) in a communication channel such as communication channels 15/25 of FIG. 1 (i.e., X4 or X16 widths), then not all data is sent across all lanes; (that is, different data is sent on each lane).

Figure 2A:
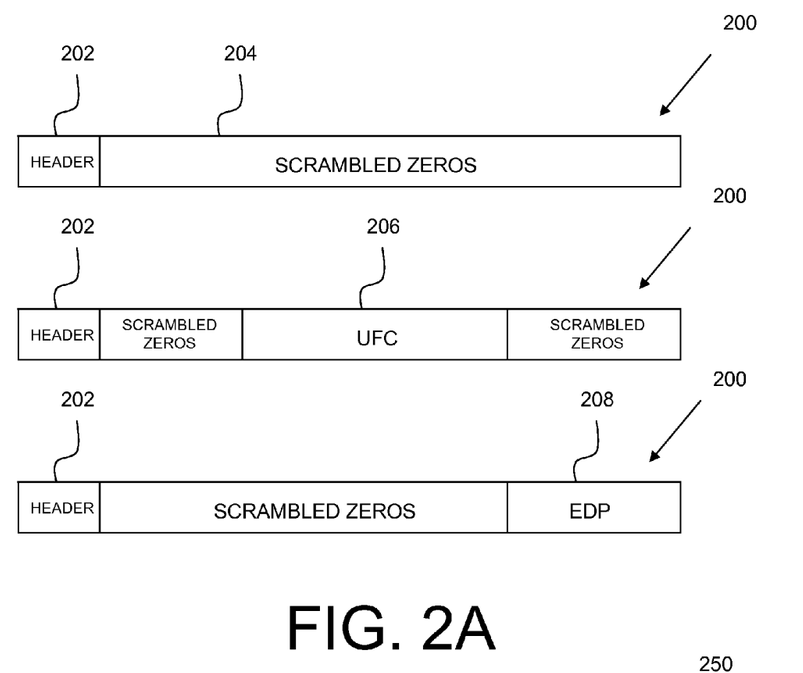
FIGS. 2A-2C illustrate example embodiments of first, second and third block formats for blocks of bits communicated in a signal.
Figure 2B:
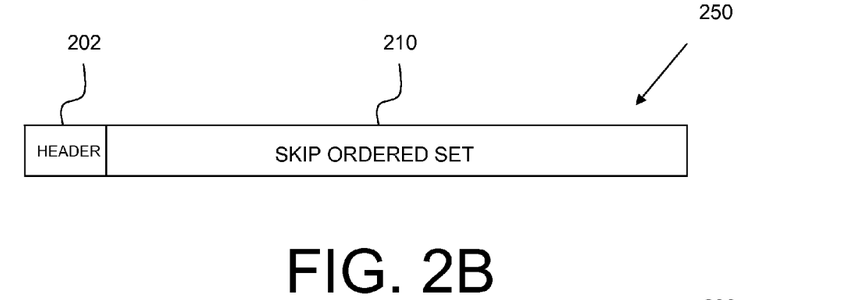
Figure 2C:
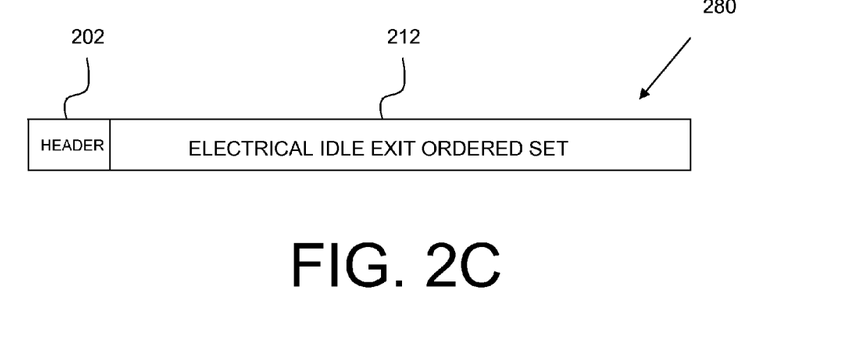

FIGS. 2A-C illustrates example embodiments of formats for first, second and third blocks of bits that are communicated in a signal. In particular, FIGS. 2A-C illustrate a first block format for a 130-bit first block 200, a second block format for a 130-bit second block 250, and a third block format for a 130-bit third block 280 that may be communicated by a PCIe device while in a Logical Idle mode.

First block 200 has a two-bit header 202, followed by 128 bits which are mostly scrambled zeros 204 generated by a 23-bit transmit LFSR at the DUT, but which also include scrambled but non-zero Update Flow Control (UFC) Packets 206 and scrambled but non-zero End Data Stream (EDS) Packets 208. Second block 250 includes a two-bit header 202, followed by 128 bits of Skip Ordered Set data which are not scrambled (and the transmit LFSR does not advance for this block). Third Block 280 includes a two-bit header 202, followed by 128 bits of Exit Electrical Idle Ordered Set data 212 which are not scrambled. The Exit Electrical Idle Exit Ordered Set (EIEOS) data 212 indicates that the 23-bit transmit LFSR is being reset.

During the vast majority of the time that a PCIe DUT transmits in a Logical Idle mode, the transmitted bits consist of the scrambled zeros, unscrambled Skip Ordered Set (SOS) data, and unscrambled EIEOS data. Therefore, the signal transmitted by a PCIe DUT while in a Logical Idle mode can be considered to comprise first portions that include scrambled bits (e.g., scrambled zeros) produced from a selected bit pattern (zeros) and a selected scrambling algorithm (e.g., the algorithm or polynomial realized by the PCIe DUT's 23-bit transmit LFSR), and further includes second portions that include unscrambled bits (e.g., the bits of two-bit header 202, SOS data, and the EIEOS data), where the first portions and second portions are interspersed within the signal.

Meanwhile, since the scrambled zeros are generated with a 23-bit transmit LFSR according to a known selected algorithm, an analyzer (e.g., analyzer 100) can instantiate its own 23-bit test LFSR executing the known selected algorithm to generate a test bit sequence which can be compared with received scrambled bits of a received signal in the Logical Idle mode to determine the BER of the received signal.

However, to do this, analyzer 100 must address several issues.

First, the test LFSR of analyzer 100 must be synchronized to the transmit LFSR of the DUT. Synchronization is complicated by the presence of unscrambled bits in the received signal that do not advance the transmit LFSR at the DUT, and which therefore must be accounted for in analyzer 100, and by the EIEOS data that resets the transmit LFSR.

Also, as noted above, the scrambled zeros produced by the transmit LFSR of the DUT are interspersed in the received signal with several other types of bits, including unscrambled bits, and UFC and EDS packets. Furthermore, in general, the first blocks 200, second blocks 250, and third blocks 280 are not distributed within the received signal according to a repeating pattern than is known in advance. The scrambled zeros must be identified and separated from the other bits so that only the appropriate bits are used for advancing the test LFSR and determining the BER.

Furthermore, as mentioned above, PCIe Gen3 assumes that communication channels are "bonded." However, it is desirable to be able to determine the BER of each lane. In that case, a BER algorithm cannot use information combined from multiple lanes as that would make it very difficult to determine which lane had the bit errors. That is, in some scenarios it may be possible that a single lane with a very high BER makes it look like all of the other lanes bonded with it also have a very high BER, even though the BERs of the other lanes are all much, much lower.

Accordingly, devices and methods will be described below for determining a BER of a signal output by a PCIe DUT while in a Logical Idle mode as described above with respect to FIGS. 2A-C.

Figure 3:
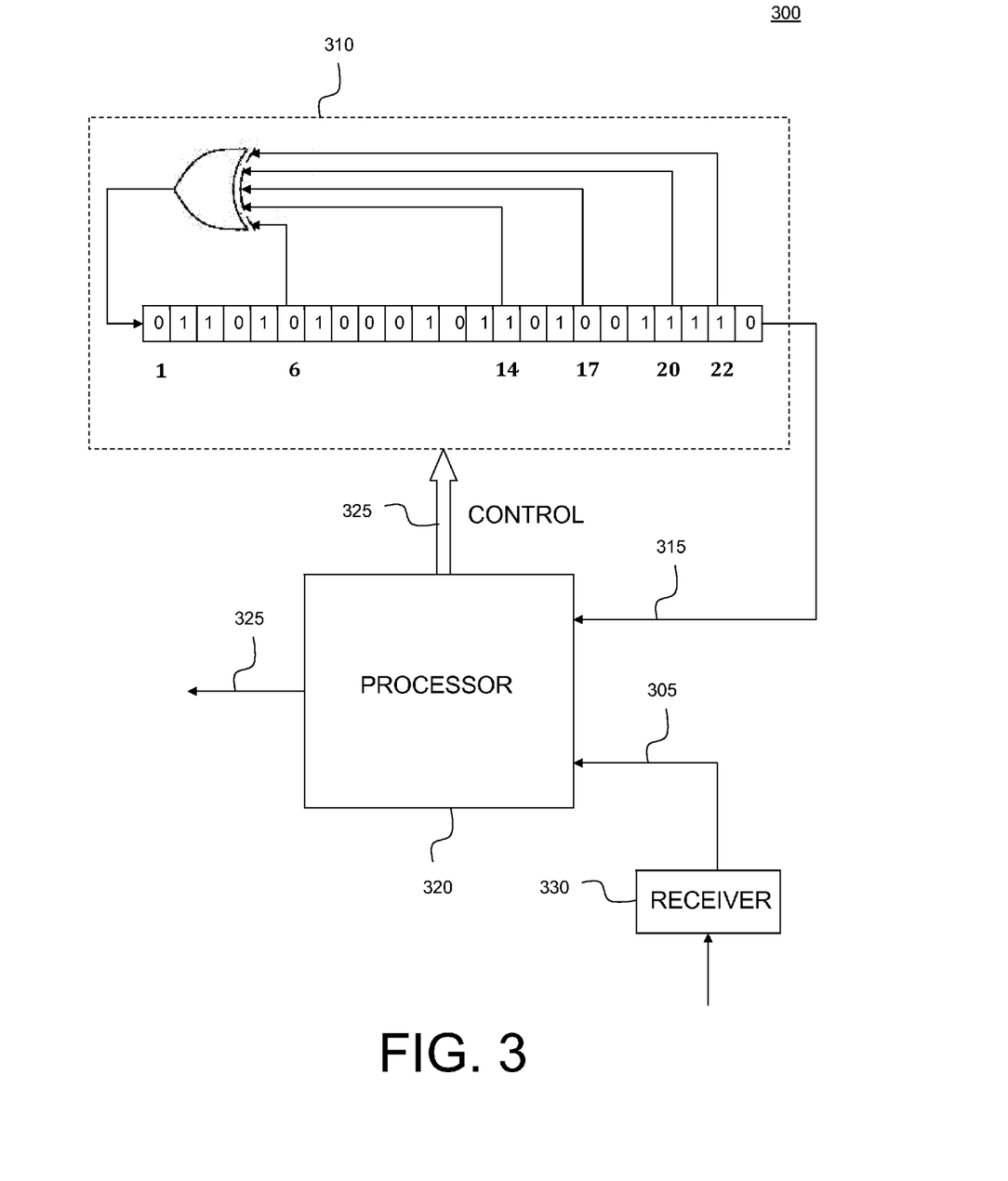
FIG. 3 shows a functional block diagram of one embodiment of a device for generating a sequence of bits from a received signal for making a bit error rate (BER) measurement.

FIG. 3 shows a functional block diagram of one embodiment of a device 300 for generating a sequence of bits from a received signal for making a BER measurement. Device 300 includes a test linear feedback shift register (LFSR) 310, a processor 320 and a receiver 330. The elements of device 300 may be realized by any combination of hardware components, firmware, and microprocessor(s) or digital signal processor(s) executing software instructions stored in a memory device. Beneficially, processor 320 may control various operations of device 300 to execute one or more algorithms, for example as disclosed below with respect to FIGS. 4-9.

In operation, receiver 330 receives a signal from a DUT, such as DUT 10 in FIG. 1 which may be a PCIe DUT, and provides a received signal 305 including scrambled bits to processor 320. Under control of processor 320, test LFSR 310 outputs a test bit sequence 315 which can be used together with the scrambled bits in received signal 305 to determine a bit error rate of the received signal 305. Processor 320 may process received signal 305 to generate an output signal 325 for further analysis, for example by analysis processor 130 of analyzer 100 in FIG. 1. In conjunction with the processing of received signal 305 processor 320 may operate in conjunction with test LFSR 310 to determine a bit error rate of received signal 305.

In one embodiment, device 300 may be included in signal processor 120 of analyzer 100 shown in FIG. 1 and may process a received signal. In one embodiment, receiver 330 of device 300 receives a signal transmitted by a PCIe DUT while in the Logical Idle mode, as illustrated above with respect to FIGS. 2A-B, and determines a BER of the received signal.

Methods will now be described by which processor 320 can process bits received in received signal, and control operations of test LFSR 310, to generate test bit sequence 315 and determine a bit error rate of received signal 305.

Figure 4:
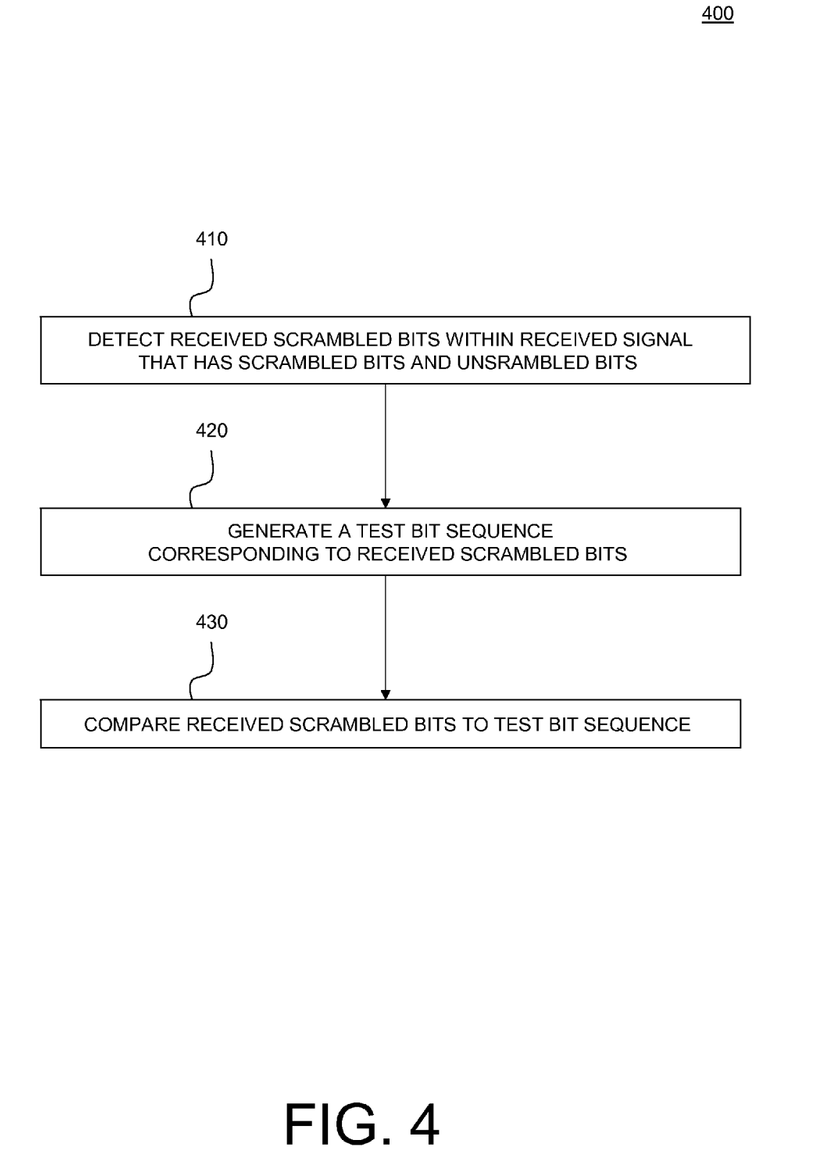
FIG. 4 shows a high level flowchart of one embodiment of a method of determining a BER of a signal transmitted by a DUT.

FIG. 4 shows a high level flowchart of one embodiment of a method 400 of determining a BER of a signal received from a DUT, for example received signal 305 of FIG. 3. In a particular embodiment, method 400 is a method of determining a BER of a signal output by a PCIe DUT while in a Logical Idle mode as described above with respect to FIGS. 2A-C—which is a normal operating mode of the PCIe DUT—and which is received or monitored by an analyzer, for example analyzer 100.

Method 400 includes a step 410 of detecting received scrambled bits within a received signal that has first portions that include scrambled bits produced from a selected bit pattern and a selected scrambling algorithm, and further includes second portions that include unscrambled bits, where the first portions and second portions being interspersed within the signal. An example of such a signal is the signal transmitted by a PCIe DUT while in the Logical Idle mode, as illustrated and described above with respect to FIGS. 2A-C.

Step 420 includes generating a test bit sequence using the selected scrambling algorithm and the selected bit pattern, including generating one bit for the test bit sequence for every received scrambled bit within the received signal, and not generating a bit for the test bit sequence for every received unscrambled bit within the received signal. In some embodiments, a test LFSR (e.g., test LFSR 310) in an analyzer (e.g., analyzer 100) is employed to generate the test bit sequence.

Step 430 includes comparing the received scrambled bits to the test bit sequence to determine a bit error rate of the received signal. Because step 420 does not generate a bit for the test bit sequence for every received unscrambled bit within the received signal, the test bit sequence can be compared bit-by-bit against the scrambled bits within the received signal in order to perform a BER measurement.

It should be understood that steps 410 and 420 are not necessarily performed sequentially, and indeed in general are performed in parallel with each other. Furthermore, it should be understood that the steps are performed repeatedly for each new scrambled bit that is obtained.

Figure 5:
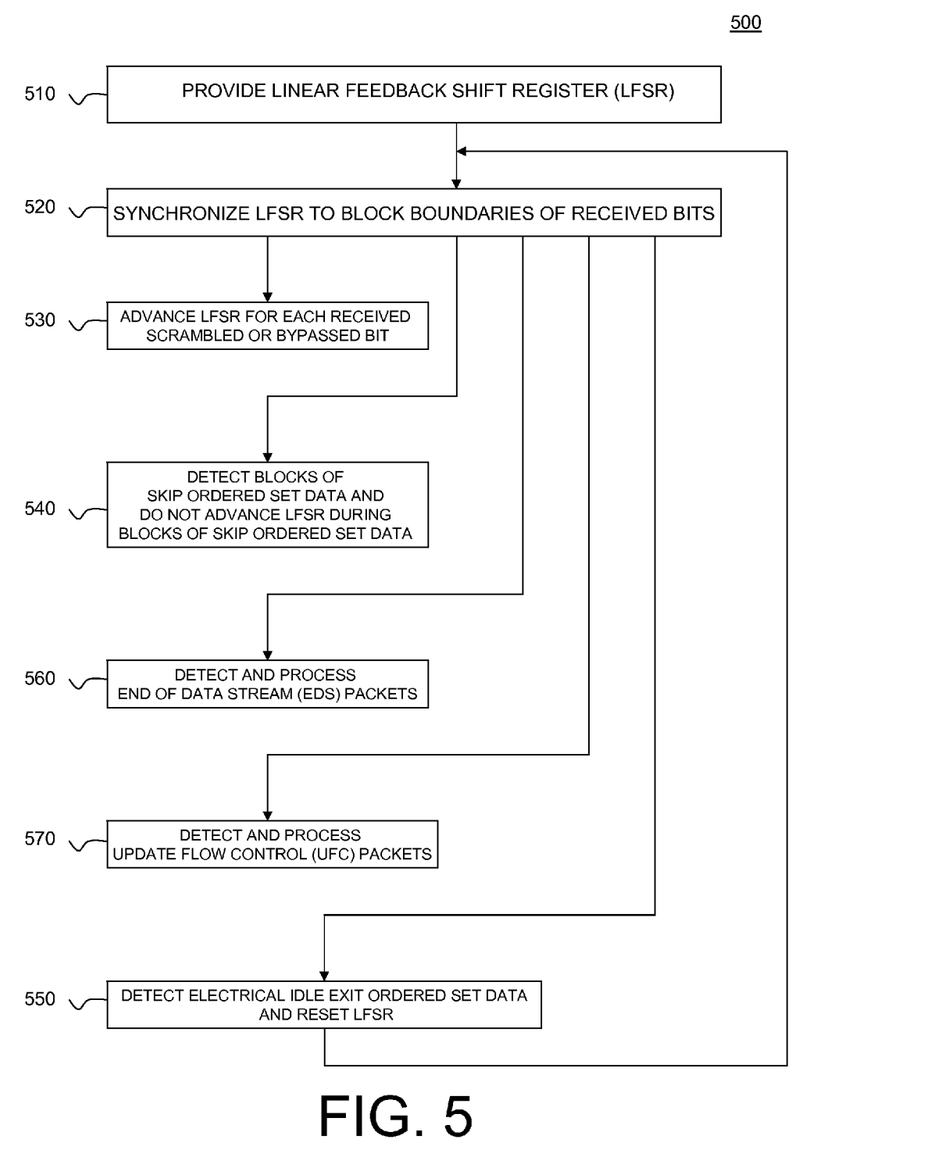
FIG. 5 shows a flowchart of one embodiment of a method of generating a test bit sequence for determining a bit error rate of a received signal.

FIG. 5 shows a flowchart of one embodiment of a method 500 of generating a test bit sequence for an analyzer (e.g., analyzer 100) to determine a BER of a received signal. In particular, method 500 generates a test bit sequence for comparison with scrambled bits of a received signal from a PCIe DUT in a Logical Idle mode according to method 400.

Step 510 provides a test LFSR, for example test LFSR 310 of device 300.

In a step 520, the test LFSR is synchronized to a pattern of scrambled bits in a PCIe signal that is monitored or received by analyzer 100, in particular a signal that transmitted in a Logical Idle mode as described above with respect to FIG. 2A. When the test LFSR is synchronized to the scrambled bits from the transmit LFSR from the PCIe DUT, and is loaded with the correct bit pattern of N=23 bits, then it should correctly predict the next M scrambled bits that are received, where M can be calculated to achieve a desired probability of not synchronizing incorrectly. For example, in one embodiment if the test LFSR predicts the next 17 scrambled bits correctly, the probability of incorrect synchronization may be very small, e.g., 7E-6. In this case, analyzer 100 may assume that the test LFSR is synchronized when it correctly predicts the next 17 scrambled bits.

In particular, as described above, a PCIe DUT includes a transmit LFSR that in the Logical Idle mode transmits first blocks 200 and second blocks 250. Each first block 200 includes some unscrambled bits at first fixed positions (i.e. the bits of two-bit header 202) within the first block, and includes some scrambled bits (i.e., scrambled zeros) at second fixed positions within the first block. Here, in step 520 the test LFSR is synchronized to boundaries of the first blocks 200 in a received signal such that the test LFSR is not advanced for the unscrambled bits (e.g., the bits of two-bit header 202) within the first blocks of the received signal. A detailed description of one embodiment of a block boundary synchronization algorithm will be described below with respect to FIG. 6.

Once the test LFSR is synchronized to the pattern of scrambled bits in a PCIe signal, a series of operations as described below with respect to steps 530-570 are performed essentially in parallel.

In a step 530, the test LFSR is advanced for each received scrambled bit within the received signal.

In a step 540, blocks of Skip Ordered Set (SOS) data (i.e., second blocks 250) are detected. When a second block 250 of SOS data is detected in step 540, the test LFSR is not advanced for these blocks. A detailed description of one embodiment of a method of detecting SOS data will be described below with respect to FIG. 7.

In a step 550, blocks of Electrical Idle Exit Ordered Set (EIEOS) data (i.e., third blocks 280) are detected indicating that the test LFSR should be resynchronized to the received scrambled bits. When a third block 280 of EIEOS data is detected in step 550, the test LFSR is reset and the process returns to step 520 where the test LFSR is resynchronized to the pattern of scrambled bits in a PCIe signal. A more detailed description of one embodiment of a method of detecting EIEOS data will be described below with respect to FIG. 7.

In a step 560, End of Data Stream (EDS) packets 208 within the received signal are detected and processed. When an EDS packet is detected, the test LFSR is advanced. A detailed description of one embodiment of a method of detecting and processing EDS packets 208 is described below with respect to FIG. 8.

In a step 570, Update Flow Control (UFC) packets 206 are detected and processed. When a UFC packet is detected, the test LFSR is advanced. A detailed description of one embodiment of a method of detecting and processing UFC packets 206 is described below with respect to FIG. 9.

It should be understood that steps 530-570 are not necessarily performed sequentially, and indeed in general may be performed in parallel with each other as illustrated in FIG. 5. Furthermore, it should be understood that the steps 530-570 are performed repeatedly as new bits are received in the received signal. Also, when in step 540 a third block 280 of EIEOS data is detected, the test LFSR is reset and the process returns to step 520.

Figure 6:
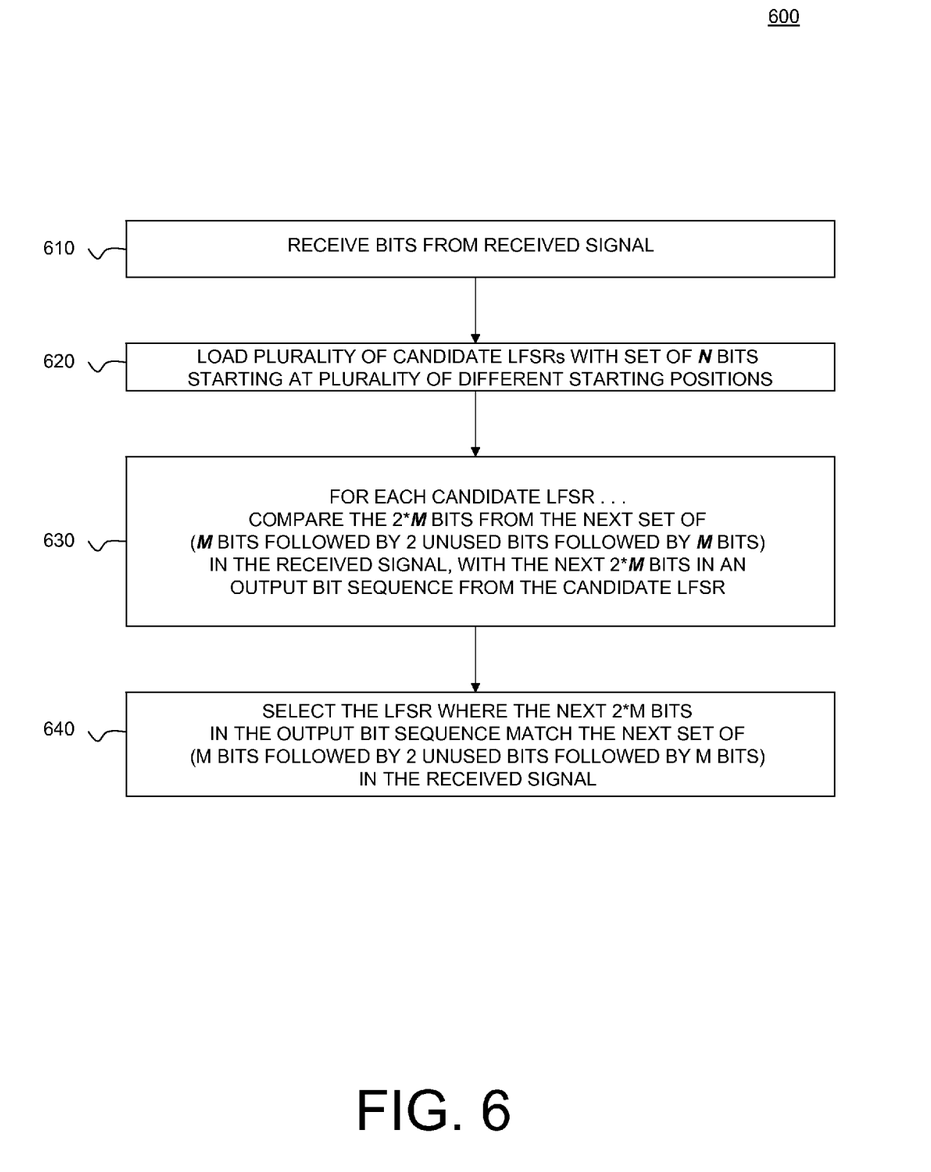
FIG. 6 shows a flowchart of one embodiment of a method of synchronizing a linear feedback shift register to a received signal.

FIG. 6 shows a flowchart of one embodiment of a method 600 of synchronizing a test linear feedback shift register (LFSR) to a received signal (e.g., in step 520 in FIG. 5), and in particular a method of synchronizing the test LFSR to boundaries of first blocks 200 in a received signal from a PCIe DUT in a Logical Idle mode such that the test LFSR is not advanced for the unscrambled bits (e.g., the bits of two-bit header 202) within first blocks 200.

As noted above, when the test LFSR is synchronized to the scrambled bits from the transmit LFSR from the PCIe DUT, and is loaded with the correct bit pattern of N=23 bits, then the test LFSR can be considered to be properly synchronized when it correctly predicts the next M=17 scrambled bits. Because M+N=40<128, it is easy to find a place inside a first block 200 to synchronize test LFSR. However, this alone is not sufficient, as it is necessary to also know where the beginning of each first block 200 is, to synchronize the test LFSR to the boundaries of the first blocks in the received signal so that the test LFSR is not advanced for the two bits in the two-bit header 202.

The start of a first block 200 may be identified as follows. The test LFSR is loaded with a trial set of N received bits, and then the 2*M bits among the next set of (M bits, followed by 2 unused bits, followed by M bits) in the received signal is compared with the next 2*M bits from the test bit sequence generated by the test LFSR. When the next 2*M bits in the test bit sequence from the test LFSR match the next set of (M bits followed by 2 unused bits followed by M bits) in the received signal, it is determined that the test LFSR is synchronized with the boundaries of the first blocks 200 in the received signal. Of course, in general this comparison needs to be done for a plurality of different sets of N bits from the received signal at a plurality of different "starting" oppositions before a match will be found.

To expedite this process, in one embodiment in a step 620 a plurality of "candidate" LFSRs (e.g., 40 LFSRs) are instantiated and each candidate LFSR is loaded with a set of N=23 received bits, such that each candidate LFSR operates with a different starting position.

In a step 630, for each candidate LFSR, the 2*M bits from a next set of (M bits followed by 2 unused bits followed by M bits) in the received signal are compared with the next 2*M bits in an output bit sequence generated by the candidate LFSR.

In a step 640, one of the candidate LFSRs where the next 2*M bits in the output bit sequence generated by the candidate LFSR match the next set of (M bits followed by 2 unused bits followed by M bits) in the received signal is determined to be synchronized at the correct position, and this candidate LFSR is selected as the test LFSR to be used for generating the test bit sequence to be used for the BER measurements, and location of two-bit header 202 is also therefore identified and used for the rest of the steps 530 through 570 to know when not to advance the test LFSR for each two-bit header 202.

Figure 7:
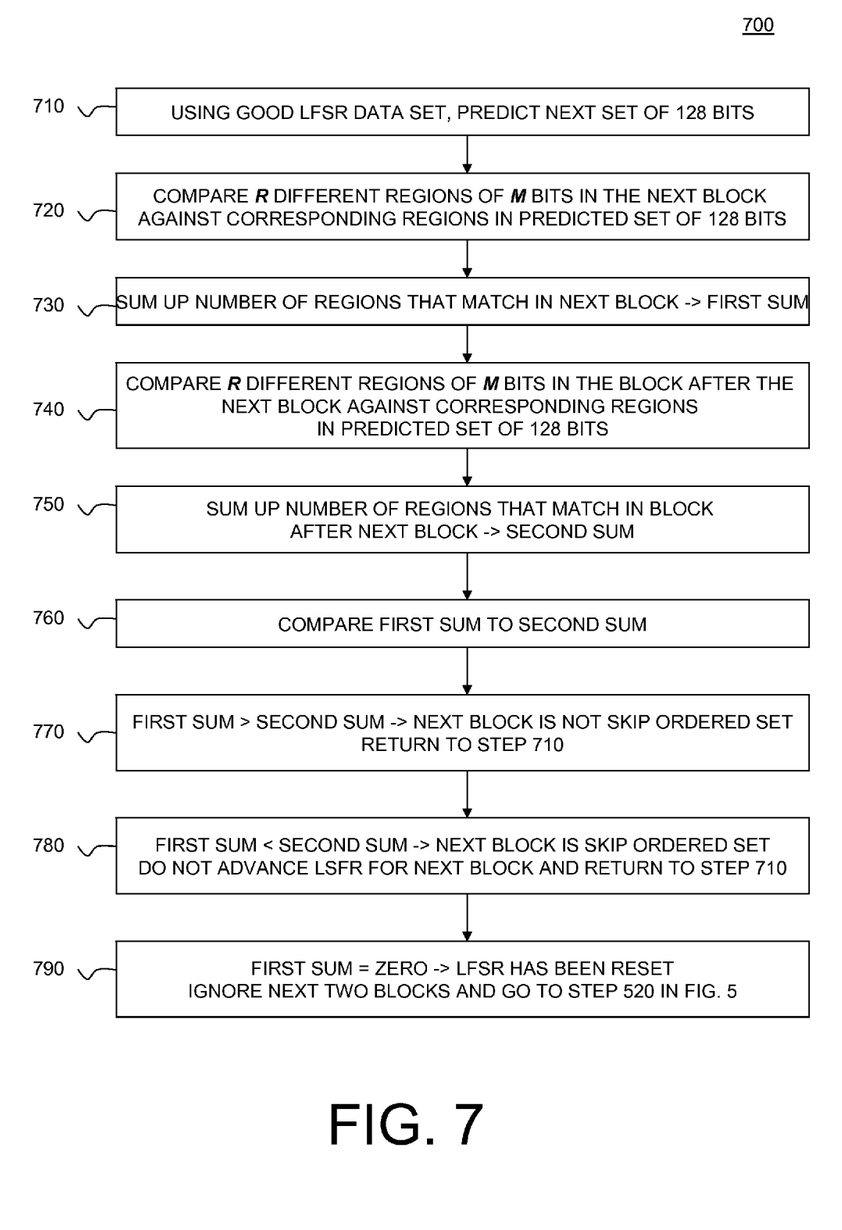
FIG. 7 illustrates a flowchart of one embodiment of a method of detecting blocks of unscrambled bits in a signal having scrambled bits and unscrambled bits.

FIG. 7 illustrates a flowchart of one embodiment of a method of detecting blocks of unscrambled bits in a signal having scrambled bits and unscrambled bits (e.g., in steps 540 and 550 in FIG. 5). In particular, FIG. 7 shows a method 700 of detecting second blocks 250 of unscrambled SOS data and third blocks 280 of unscrambled EIEOS DATA in a received signal from a PCIe DUT in a Logical Idle mode.

At the outset, it is assumed that the test LFSR is synchronized to the scrambled zeros in the received signal, and therefore already loaded with "known" good data. In a step 710, the test LFSR predicts a next set of 128 bits.

In a step 720, each of a plurality (e.g., R=8) of different groups or regions of M (e.g., 17) consecutive bits within the next received block are compared with a corresponding group or region of M consecutive bits within the predicted next set of 128 output bits from the test LFSR, and if the comparison result is greater than a threshold, then the group is considered to be a match.

In a step 730, the number of groups within the next received block where there is a match is summed up to produce a first sum.

In a step 740 each of a plurality (e.g., R=8) of different groups of M consecutive bits within the immediately subsequent received block after the next received block are compared with a corresponding group of M consecutive bits within the predicted next set of output bits from the test LFSR and if a comparison result is greater than the threshold, then the group is considered to be a match.

In a step 750, the number of groups within the immediately subsequent received block after the next received block where there is a match is summed to produce a second sum.

In a step 760, the first sum is compared to the second sum.

In a step 770, when the first sum is greater than the second sum, it is determined that the next received block is a first block 200, in which case the test LFSR is advanced for the bits in the next block (other than the bits of two-bit header 202) and the process returns to step 710.

In a step 780, when the first sum is less than the second sum, it is determined that the next received block is a second block 250 comprising unscrambled Skip Ordered Set data. Whenever a block is determined to be a second block 250 comprising SOS data, then the test LFSR is not advanced for bits received during that block.

In a step 790, when the first sum is zero, then the next block is determined to be a third block 280 comprising EIEOS data. In that case, the transmit LFSR is reset. Accordingly, at analyzer 100 the next two received blocks are discarded and the process proceeds to step 520 of FIG. 5 where the test LFSR is resynchronized to the scrambled bits from the transmit LFSR from the PCIe DUT. It should be noted that the errors counted up to this point are not discarded—the BER measurement process is just temporarily interrupted until the test LFSR is resynchronized to the scrambled bits from the transmit LFSR.

Figure 8:
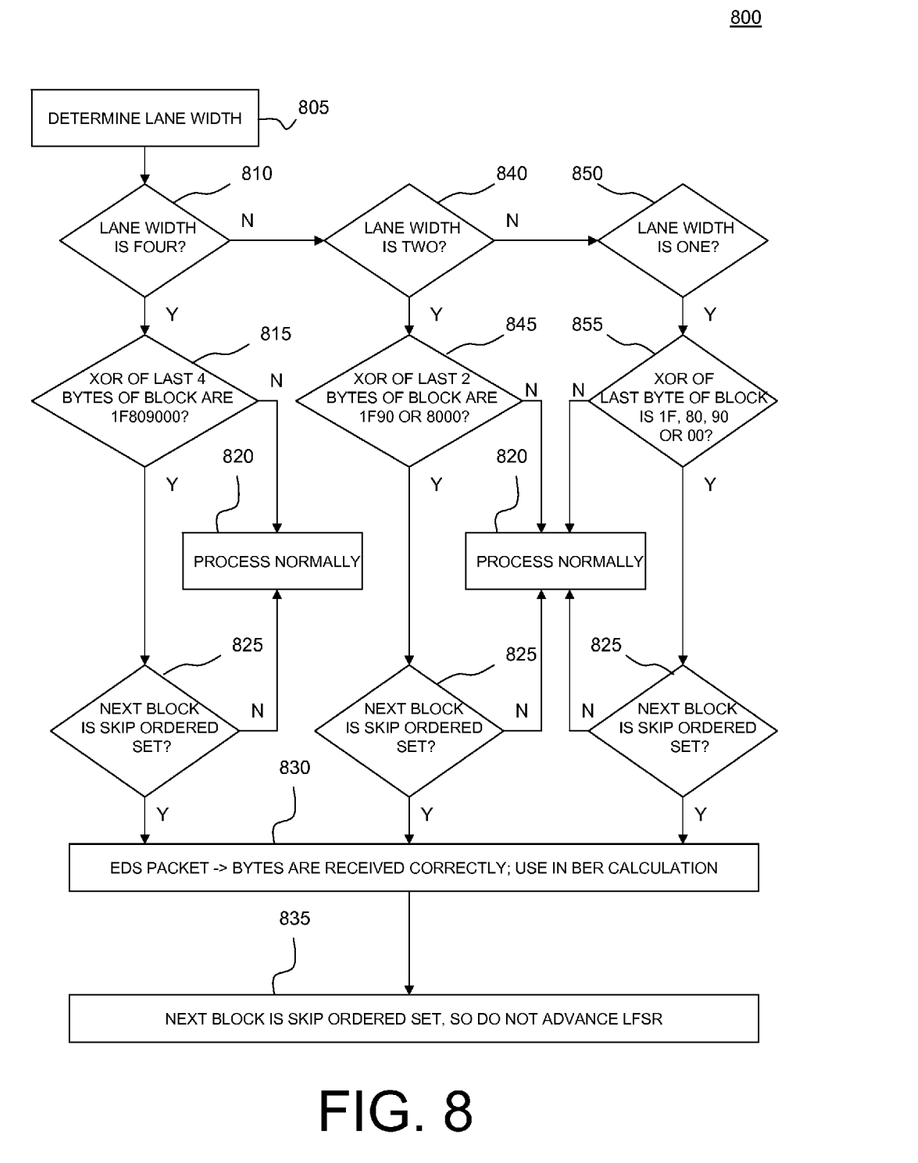
FIG. 8 illustrates a flowchart of one embodiment of a method of detecting End Data Stream (EDS) packets in a signal transmitted by a Peripheral Component Interconnect Express (PCIe) device and handling EDS bytes in a BER measurement.

FIG. 8 illustrates a flowchart of one embodiment of a method 800 of detecting and handling End Data Stream (EDS) packets in a signal transmitted by a Peripheral Component Interconnect Express (PCIe) device in a BER measurement (e.g., in step 560 in FIG. 5).

In a PCIe Gen3 DUT, an EDS packet looks like: 1F809000, and can only occur prior to a second block 250 having the SOS data. As noted above, PCIe Gen3 lanes are bundled together and the same data is not transmitted across each lane. Accordingly, the bytes that will be received on any one lane for an EDS packet will depend upon the lane width.

In the example of FIG. 8, the only allowed lane widths are 1, 2 and 4. However, the principles illustrated in FIG. 8 can easily be extrapolated to other lane width possibilities, including for example 8.

In a step 805, the lane width is determined, for example by a user input, or from an input signal from the PCIe DUT.

In a step 810, it is determined whether the lane width is 4. If so, then the process proceeds to step 815. Otherwise, the process proceeds to step 840 described below.

In a step 815, it is determined whether or not the last four bytes of a first block 200 are 1F809000. If not then the first block 200 does not include an EDS packet, and the process proceeds to step 820 where the received bits are processed normally. Otherwise, if the last four bytes of a first block 200 are 1F809000, then the process proceeds to step 825.

In a step 825, a check is made to determine whether or not the next block is a second block comprising SOS data. This check may be done, for example, according to method 700 described above. If it is determined that the next block is not a second block 250 comprising SOS data, then the process proceeds to step 820 where the received bits are processed normally. Otherwise, if the next block is a second block 250 comprising SOS data, then, then the process proceeds to step 830.

In a step 830, it is determined that the last bytes of the first block 200 comprise an EDS packet. Since the correct bits for an EDS packet are known, in some embodiments the bits for the EDS packet may be utilized in the BER calculation. In other embodiments, the bits for the EDS packet may be ignored for the BER calculation. Then the process proceeds to step 835.

Since it has been previously determined in step 825 that the next block is a second block 250 of SOS data, in a step 835 the test LFSR is not advanced for the bits received during the next block.

In a step 840, it is determined whether the lane width is two (2). If so, then the process proceeds to step 845. Otherwise, the process proceeds to step 850.

In a step 845, it is determined whether or not the last two bytes of the first block 200 are either 1F90 or 8000. If not then the first block 200 does not include an EDS packet, and the process proceeds to step 820 where the received bits are processed normally as explained above. Otherwise, the process proceeds to step 825 as explained above.

In a step 850, it is determined that the lane width is one (1), and the process proceeds to step 855.

In a step 855, it is determined whether or not the last byte of the first block 200 is either 1F, 90, 80 or 00. If not then the first block 200 does not include an EDS packet, and the process proceeds to step 820 where the received bits are processed normally. Otherwise, the process proceeds to step 825.

Figure 9:
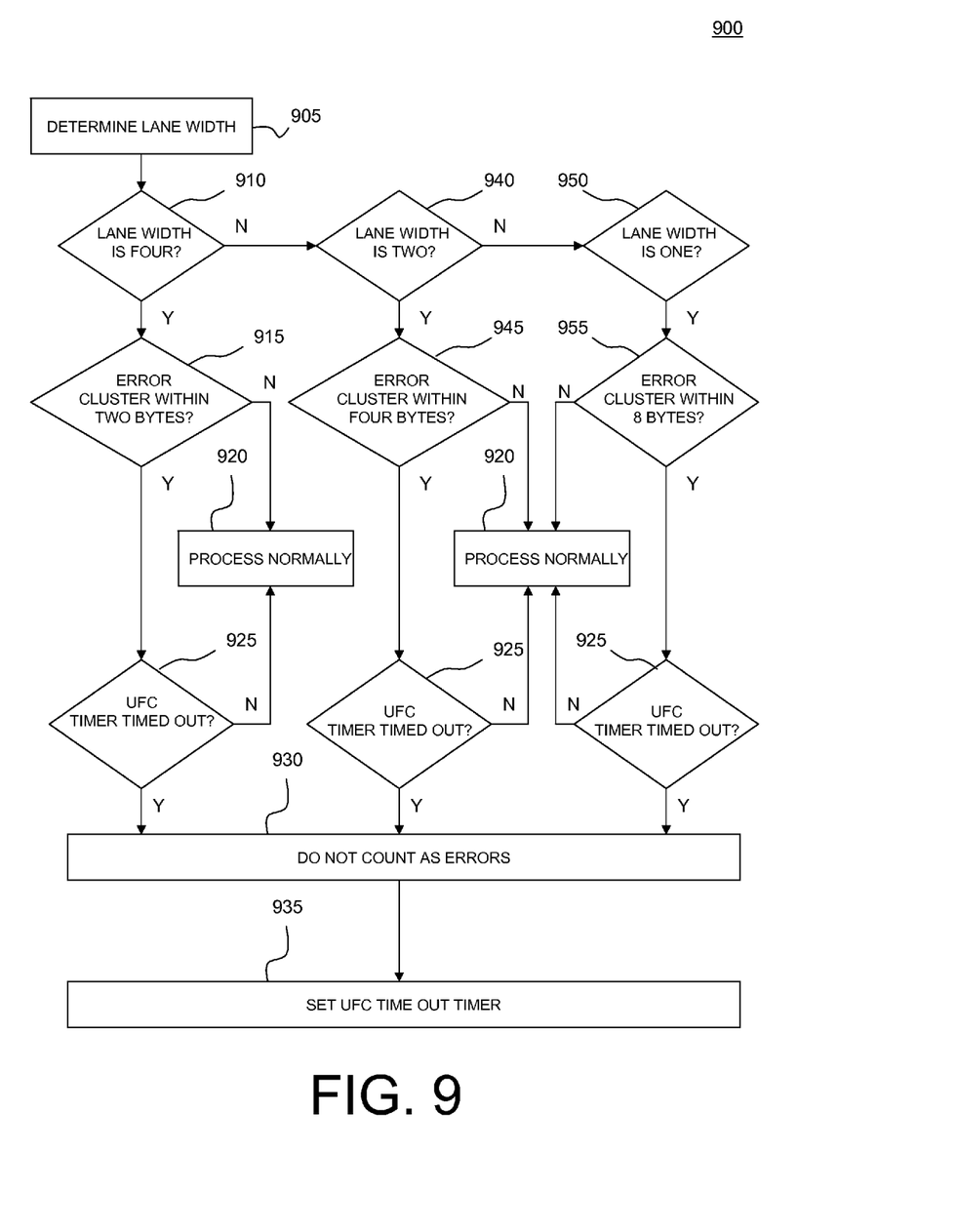
FIG. 9 a flowchart of one embodiment of a method of detecting Update Flow Control (UFC) packets in a signal transmitted by a Peripheral Component Interconnect Express (PCIe) device and handling UFC bytes in a BER measurement.

FIG. 9 a flowchart of one embodiment of a method 900 of detecting and handling Update Flow Control (UFC) packets in a signal transmitted by a Peripheral Component Interconnect Express (PCIe) device in a BER measurement (e.g., in step 570 in FIG. 5). For simplicity of explanation, the example only illustrates an embodiment of the algorithm where a single UFC is sent every N μsec., however it should be evident how to expand this to the case when multiple UFCs are sent every N μsec.

In a PCIe Gen3 DUT, a UFC packet consists of eight (8) bytes and looks like: F0ACTXXXXXXXXXXX, where T is a value between 8 and A, and the X values are variable data and cyclic redundancy check bytes. As noted above, PCIe Gen3 lanes are bundled together and the same data is not transmitted across each lane. Accordingly, the number of bytes that will be received on any one lane for a UFC packet will depend upon the lane width.

UFC packets are sent some number of times within some time window, for example once every 30 μs. Assuming that analyzer 100 knows the minimum time between UFC packets, for example by the particular protocol that is employed by the DUT, or via a signal communicated from the DUT, etc., then method 900 can reduce the chance that UFC packets will be counted as bit errors.

In the example of FIG. 9, the only allowed lane widths are 1, 2 and 4. However, the principles illustrated in FIG. 9 can easily be extrapolated to other lane width possibilities.

In a step 905, the lane width is determined, for example by a user input, or from input signals from the PCIe DUT.

In a step 910, it is determined whether or not the lane width if four (4). If so, then the process proceeds to step 915. Otherwise, the process proceeds to step 940 described below.

In a step 915, it is determined whether or not a cluster of errors has occurred within two (2) bytes. If not then it is decided that no UFC packet has been detected, and the process proceeds to step 920 where the received bits are processed normally. Otherwise, the process proceeds to step 925.

In a step 925, it is checked whether or not a UFC timeout timer has timed out. More specifically, as described below with respect to step 935, when a UFC packet is detected, a timeout timer or counter is set or started based on the minimum time period between UFC packets to disable detection of another UFC packet until a timeout period expires. If another cluster of errors occurs between the time that the last UFC packet was detected and the minimum time between UFC packets (i.e., the UFC timeout timer has not yet timed out), then the process proceeds to step 920 and the errors are treated as regular bit errors. Otherwise, the process proceeds to step 930.

In a step 930, the error cluster is not counted as errors and is ignored in determining the BER of the received signal, and the process proceeds to step 935.

In a step 935, the UFC timeout timer or counter is started with a timeout period corresponding to the minimum time period between UFC packets.

In a step 940, it is determined whether the lane width is two (2). If so, then the process proceeds to step 945. Otherwise, the process proceeds to step 950.

In a step 945, it is determined whether or not a cluster of errors has occurred within four (4) bytes. If not then it is decided that no UFC packet has been detected, and the process proceeds to step 920 where the received bits are processed normally as explained above. Otherwise, the process proceeds to step 925 as explained above.

In a step 950, it is decided that the lane width is one (1), and the process proceeds to step 855.

In a step 955, it is determined whether or not a cluster of errors has occurred within eight (8) bytes. If not then it is decided that no UFC packet has been detected, and the process proceeds to step 920 where the received bits are processed normally as explained above. Otherwise, the process proceeds to step 925 as explained above.

It can be seen that in a case where the allowed lane widths include a width greater than 4 (e.g., 8) then it is determined whether a cluster of errors has occurred within a single byte, and the process proceeds accordingly.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method for testing a device under test (DUT), the method comprising:
   receiving a signal transmitted by the DUT, wherein the signal includes first portions that include scrambled bits produced from a selected bit pattern and a selected scrambling algorithm, and further includes second portions that include unscrambled bits, the first portions and second portions being interspersed within the signal;
   detecting received scrambled bits within the received signal;
   generating a test bit sequence using the selected scrambling algorithm and the selected bit pattern, including generating a bit for the test bit sequence for each of the received scrambled bits within the received signal, and not generating a bit for the test bit sequence for each of the received unscrambled bits within the received signal;
   comparing the received scrambled bits to the test bit sequence to determine a bit error rate of the received signal; and
   operating a test linear feedback shift register (LFSR) according to the selected scrambling algorithm and the selected bit pattern to generate the test bit sequence, wherein the unscrambled bits include bits indicating that the test LFSR should be resynchronized to the received scrambled bits, and the method further comprises detecting the unscrambled bits indicating that the test LFSR should be resynchronized to the received scrambled bits and in response thereto, resynchronizing the test LFSR to the received scrambled bits.

2. The method of claim 1, wherein the signal includes first blocks of bits having a first block format, wherein each of the first blocks includes some of the unscrambled bits which do not advance the test LFSR at first fixed positions within the first block and includes some of the scrambled bits at second fixed positions within the first block, and wherein generating the test bit sequence comprises synchronizing the test LFSR to the scrambled bits and to boundaries of the first blocks in the received signal and not advancing the test LFSR for the unscrambled bits within the first blocks of the received signal.

3. The method of claim 2, wherein synchronizing the test LFSR to the scrambled bits and the boundaries of the first blocks comprises:
   loading the test LFSR with a set of N received bits;
   comparing 2*M bits from a next set of (M bits followed by 2 unused bits followed by M bits) in the received signal, with a next 2*M bits in the test bit sequence generated by the test LFSR; and
   when the next 2*M bits in the test bit sequence generated by the test LFSR match the next set of (M bits followed by 2 unused bits followed by M bits) in the received signal, determining that the test LFSR is synchronized with the boundaries of the first blocks in the received signal.

4. The method of claim 2, wherein synchronizing the test LFSR to the scrambled bits and the boundaries of the first blocks comprises:
   loading each of a plurality of candidate LFSRs with a set of N received bits;
   for each of the candidate LFSRs, comparing 2*M bits from a next set of (M bits followed by 2 unused bits followed by M bits) in the received signal, with a next 2*M bits in an output bit sequence generated by the candidate LFSR; and
   selecting as the test LFSR one of the candidate LFSRs where next 2*M bits in the output bit sequence generated by the candidate LFSR match the next set of (M bits followed by 2 unused bits followed by M bits) in the received signal.

5. The method of claim 2, wherein the signal includes second blocks of bits having a second block format, wherein the second blocks of bits comprise unscrambled bits, wherein the first blocks and second blocks are not distributed within the signal according to a repeating pattern, and wherein generating the test bit sequence comprises not advancing the test LFSR for the unscrambled bits within the second blocks of the received signal.

6. An apparatus including:
   a device for receiving a signal transmitted by a device under test (DUT), wherein the signal includes first portions that include scrambled bits produced from a selected bit pattern and a selected scrambling algorithm, and further includes second portions that include unscrambled bits, the first portions and second portions being interspersed within the signal;
   a processor configured to cause the apparatus to execute an algorithm comprising:

detecting received scrambled bits within the received signal;

generating a test bit sequence using the selected scrambling algorithm and the selected bit pattern, including generating one bit for the test bit sequence for each of the received scrambled bits within the received signal, and not generating a bit for the test bit sequence for each of the received unscrambled bit within the received signal; and comparing the received scrambled bits to the test bit sequence to determine a bit error rate of the received signal; and a test linear feedback shift register (LFSR) operating according to the selected scrambling algorithm and the selected bit pattern to generate the test bit sequence wherein the unscrambled bits include bits indicating that the test LFSR should be resynchronized to the received scrambled bits, and wherein the algorithm further comprises detecting the unscrambled bits including the bits indicating that the test LFSR should be resynchronized to the received scrambled bits and in response thereto, resynchronizing the test LFSR to the received scrambled bits.

7. The apparatus of claim 6, wherein the signal includes first blocks of bits having a first block format, wherein each of the first blocks includes some of the unscrambled bits at first fixed positions within the first block and includes some of the scrambled bits at second fixed positions within the first block, and wherein the apparatus is configured to generate the test bit sequence by synchronizing the test LFSR to the scrambled bits and boundaries of the first blocks in the received signal and not advancing the test LFSR for the unscrambled bits within the first blocks in the received signal.

8. The apparatus of claim 7, wherein the apparatus is configured to synchronize the test LFSR to the scrambled bits and the boundaries of the first blocks by:

loading the test LFSR with a set of N received bits;

comparing 2*M bits from a next set of (M bits followed by 2 unused bits followed by M bits) in the received signal, with a next 2*M bits in the test bit sequence generated by the test LFSR; and when the next 2*M bits in the test bit sequence generated by the test LFSR match the next set of (M bits followed by 2 unused bits followed by M bits) in the received signal, determining that the test LFSR is synchronized with the boundaries of the first blocks in the received signal.

9. The apparatus of claim 7, wherein the apparatus is configured to synchronize the test LFSR to the scrambled bits and the boundaries of the first blocks by:

loading each of a plurality of candidate LFSRs with a set of N received bits;

for each of the candidate LFSRs, comparing 2*M bits from a next set of (M bits followed by 2 unused bits followed by M bits) in the received signal, with a next 2*M bits in an output bit sequence generated by the candidate LFSR; and selecting as the test LFSR one of the candidate LFSRs where the next 2*M bits in the output bit sequence generated by the candidate LFSR match the next set of (M bits followed by 2 unused bits followed by M bits) in the received signal.

10. The apparatus of claim 7, wherein the signal includes second blocks of bits having a second block format, wherein the second blocks of bits comprise unscrambled bits, wherein the first blocks and second blocks are not distributed within the signal according to a repeating pattern, and wherein the apparatus is configured to generate the test bit sequence by not advancing the test LFSR for the unscrambled bits within the second blocks in the received signal.

11. A method of analyzing a signal, comprising:

receiving a signal transmitted by a Peripheral Component Interconnect Express (PCIe) device in a logical idle mode of the PCIe device, wherein the signal includes: (1) first blocks each comprising: (A) header bits that are not scrambled, (B) scrambled bits including sequences of scrambled zeros, and (c) scrambled but non-zero Update Flow Control packets and scrambled but non-zero End Data Stream packets; (2) second blocks comprising unscrambled Skip Ordered Set data; and (3) third blocks comprising Electrical Idle Exit Ordered Set data, wherein the scrambled zeros, scrambled but non-zero Update Flow Control packets and scrambled but non-zero End Data Stream packets are generated with a selected scrambling algorithm, and wherein the first blocks, second blocks and third blocks are interspersed within the signal;

providing a test linear feedback shift register (LFSR) operating with the selected scrambling algorithm to generate a test bit sequence;

determining block boundaries for the first blocks;

synchronizing the test LFSR to the scrambled zeros and the block boundaries for the first blocks in the received signal so as to advance the test LFSR for the scrambled zeros, the Update Flow Control packets and the End Data Stream packets, and to not advance the test LFSR for the header bits;

detecting received bits of the second blocks within the received signal, and not advancing the test LFSR for the received bits of the second blocks;

detecting received bits of the third blocks within the received signal, and in response thereto resynchronizing the test LFSR to the scrambled zeros and the block boundaries for the first blocks in the received signal;

detecting received scrambled bits within the received signal; and comparing the received scrambled bits to the test bit sequence to determine a bit error rate of the received signal.

12. The method of claim 11, wherein synchronizing the test LFSR to the scrambled zeros and the block boundaries for the first blocks comprises:

loading each of a plurality of candidate LFSRs with a set of N received bits;

for each of the candidate LFSRs, comparing 2*M bits from a next set of (M bits followed by 2 unused bits followed by M bits) in the received signal, with a next 2*M bits in an output bit sequence generated by the candidate LFSR; and selecting as the test LFSR one of the candidate LFSRs where the next 2*M bits in the output bit sequence generated by the candidate LFSR match the next set of (M bits followed by 2 unused bits followed by M bits) in the received signal.

13. The method of claim 11, wherein detecting received bits of the second blocks within the received signal comprises:

using a known good set of bits in the test LFSR to predict a next set of output bits of the test LFSR;

comparing each of a plurality of groups of M consecutive bits within a next received block with a corresponding group of M consecutive bits within the predicted next set of output bits of the test LFSR, and if a comparison result is greater than a threshold considering the groups to be a match;

summing a number of groups within the next received block where there is a match to produce a first sum;

comparing each of a plurality of different groups of M consecutive bits within an immediately subsequent received block after the next received block with a corresponding group of M consecutive bits within the predicted next set of output bits of the test LFSR, and if a comparison result is greater than the threshold considering the groups to be a match;

summing a number of groups within the immediately subsequent received block after the next received block where there is a match, to produce a second sum;

comparing the first sum to the second sum;

when the first sum is less than the second sum, determining that the next received block is a second block comprising the unscrambled Skip Ordered Set data; and when the first sum is greater than the second sum, determining that the next received block is not a second block.

14. The method of claim 11, further comprising detecting received bits of an Update Flow Control packet as an error cluster within the received signal, and in response thereto advancing the test LFSR, ignoring the error cluster in determining the bit error rate, and setting a timeout counter to disable detection of another Update Flow Control packet until a timeout period expires.

15. The method of claim 11, further comprising detecting received bits of an End Data Stream packet as a known pattern and in response thereto advancing the test LFSR and utilizing the detected received bits of the End Data Stream packet to determine the bit error rate of the received signal.

16. The method of claim 15, further comprising in response to detecting the End Data Stream packet, determining that a next block in the received signal is a second block comprising Skip Ordered Set data, and not advancing the test LFSR for received bits of the next block.

* * * * *

UNITED STATES PATENT AND TRADEMARK OFFICE
CERTIFICATE OF CORRECTION

PATENT NO.         : 8,627,156 B1                                        Page 1 of 1
APPLICATION NO.    : 12/912042
DATED              : January 7, 2014
INVENTOR(S)        : Bruce Erickson It is certified that error appears in the above-identified patent and that said Letters Patent is hereby corrected as shown below:

On the Title page, in item (56), under "U.S. Patent Documents", in column 1, line 8, delete "Plankenhorn et al." and insert -- Appleton et al. --, therefor.

On the Title page, in item (56), under "Other Publications", in column 2, line 2, delete "Serminar," and insert -- Seminar, --, therefor.

In the Claims:

In column 14, line 10, in claim 11, delete "(c)" and insert -- (C) --, therefor.

Signed and Sealed this
Fifteenth Day of April, 2014

Michelle K. Lee
*Deputy Director of the United States Patent and Trademark Office*